United States Patent [19]

Kress et al.

[11] Patent Number: 4,806,593
[45] Date of Patent: Feb. 21, 1989

[54] THERMOPLASTIC MOULDING MATERIALS HAVING GOOD RESISTANCE TO AGEING AND GOOD LOW-TEMPERATURE IMPACT STRENGTH

[75] Inventors: Hans-Jürgen Kress, Pittsburgh, Pa.; Christian Lindner; Wolfgang Grape, both of Cologne; Horst Peters, Leverkusen; Jochen Schoeps; Dieter Wittmann, both of Krefeld, all of Fed. Rep. of Germany

[73] Assignee: Bayer Aktiengesellschaft, Leverkusen, Fed. Rep. of Germany

[21] Appl. No.: 97,533

[22] Filed: Sep. 16, 1987

[30] Foreign Application Priority Data

Sep. 17, 1986 [DE] Fed. Rep. of Germany ....... 3631540

[51] Int. Cl.4 ..................... C08L 51/09; C08F 283/02
[52] U.S. Cl. ..................................... 525/63; 525/464; 525/479; 525/474
[58] Field of Search .................... 525/67, 63, 64, 464, 525/479

[56] References Cited

U.S. PATENT DOCUMENTS

| | | | |
|---|---|---|---|
| 3,879,491 | 4/1975 | Lindsey et al. | 525/479 |
| 4,070,414 | 1/1978 | Falender et al. | 525/479 |
| 4,224,215 | 9/1980 | Macke | 525/464 |
| 4,305,856 | 12/1981 | Sakano et al. | 525/464 |
| 4,569,970 | 2/1986 | Paul et al. | 525/67 |

FOREIGN PATENT DOCUMENTS

| | | | |
|---|---|---|---|
| 0210510 | 2/1987 | European Pat. Off. | 525/67 |
| 1235462 | 10/1986 | Japan | 525/63 |

Primary Examiner—John C. Bleutge
Assistant Examiner—Ralph Dean, Jr.
Attorney, Agent, or Firm—Connolly & Hutz

[57] ABSTRACT

Particularly high-grade blends of thermoplastic polycarbonates, graft copolymers and, optionally, further thermoplastic resins, useful as moulding materials with good low-temperature impact strength and resistance to ageing and light, which yield mouldings with superior surfaces, are obtained from graft bases which are silicone rubbers containing sulphur in addition to groups containing carbon double bonds.

8 Claims, No Drawings

THERMOPLASTIC MOULDING MATERIALS HAVING GOOD RESISTANCE TO AGEING AND GOOD LOW-TEMPERATURE IMPACT STRENGTH

Mixtures of polycarbonate and graft polymers of vinyl monomers on rubbers and, optionally, thermoplastic copolymers of vinyl monomers are disclosed, for example in German Auslegeschrift No. 1,170,141— German Offenlegungsschrift No. 3,336,369—German Auslegeschrift No. 2,259,565 and European Pat. No. 5202.

Moulding materials based on polydiorganosiloxane-/polycarbonate block copolymers and ABS polymers are disclosed in European Pat. No. 135,794.

Because of the diene copolymerized in the ABS, the resistance to ageing and weathering of such moulding materials is not satisfactory, so that they are of only limited suitability for outdoors use.

If the oxidation-sensitive diene rubber is replaced by an alkyl acrylate rubber, the impact strength and the appearance of the mouldings is not satisfactory. For good physical properties the acrylic ester rubber employed instead of the diene rubber must be crosslinked. Moulding materials of this type are described in, for example, British Pat. No. 1,293,973, German Offenlegungsschrift No. 2,259,564, U.S. Pat. No. 2,655,824 and U.S. Pat. No. 4,148,842. Their impact strength, particularly at low temperatures, is not adequate for many applications, for example for automobile body parts.

Silicone rubbers have very good low-temperature properties and resistance to weathering. However, it is often difficult to graft them with resin-forming monomers. Such graft polymers are described in, for example, German Offenlegungsschrift Nos. 2,539,572 and 2,421,288.

Mixtures of polycarbonate, a resin of the ABS type and small amounts of an organosilicon compound, in particular polydimethylsiloxane, are described in European Pat. No. 22,979 and in U.S. Pat. No. 4,305,856.

Mixtures of thermoplastic, partly crystalline plastics for example polycarbonate and graft copolymers formed from monomers compatible with the thermoplastic, and an (optionally modified) organopolysiloxane are described in German Offenlegungsschrift No. 2,659,357. Particularly advantageous results are obtained if the starting materials in the preparation of the graft copolymers are organopolysiloxanes containing groups which are reactive to free radicals, are capable of hydrogen or halogen transfer and/or contain acrylic or methacrylic groups as side groups.

It has now been found that particularly high-grade blends of thermoplastic polycarbonates, graft copolymers and, optionally, further thermoplastic resins, useful as moulding materials with good low-temperature impact strength and resistance to ageing and light which yield mouldings with superior surfaces, are otained from graft bases which are silicone rubbers containing groups (a) to be identified below groups (b) and, groups (c) in a defined mixing ratio.

The invention relates to thermoplastic moulding materials containing:

A. 5–98 parts by weight, preferably 20–95 parts by weight, of one or more thermoplastic polycarbonates,
B. 2–70 parts by weight, preferably 5–60 parts by weight, of one or more graft polymers formed from
B.1 5–90 parts by weight, preferably 30–80 parts by weight, of a mixture of
B.1.1 50–95 parts by weight of styrene, α-methylstyrene, styrene substituted in the nucleus, methyl methacrylate or mixtures thereof, and
B.1.2 50–5 parts by weight of acrylonitrile, methacrylonitrile, methyl methacrylate, maleic anhydride, N-substituted maleimide or mixtures thereof, grafted onto
B.2 95–10 parts by weight, preferably 70–20 parts by weight, of a silicone rubber having an average particle diameter ($d_{50}$ value) of 0.09 to 1 μm, preferably 0.09 to 0.4 μm, and a gel content greater than 50% by weight, preferably greater than 70% by weight and especially 73–98% by weight, containing, essentially, units of the general formulae $$R_2SiO, RSiO_{3/2}, R_2R^3SiO_{1/2}, SiO_{4.2} \quad a.$$

and $$R^1CH{=}CH{-}(R^2){-} \quad b.$$

and $$H{-}S{-}$$

in which
R is a monovalent hydrocarbon radical, in particular saturated hydrocarbon or aromatic hydrocarbon such as $CH_3$, phenyl or $C_2H_5$,
$R^1$ is H, $C_1$–$C_6$-alkyl, in particular H or $CH_3$,
$R^2$ is a single bond, $C_1$–$C_4$-alkene, in particular $-CH_2-$, $-C_2H_4-$ or a single bond, and
$R_3$ is R or $-OH$.
wherein 0 to 0.5 molar unit of $R_2R^3SiO_{1/2}$, 0 to 10 molar units of the formula $RSiO_{3/2}$ and 0 to 3 molar units of the formula $SiO_{4/2}$ are present per 100 molar units of formula $R_2SiO$, the amount of the groups b and c is 2–10 mol %, relative to the sum of a+b+c, and the molar ratio of the groups b to c is from 3:1 to 1:3, preferably 2:1 to 1:2, and
C. 0–80 parts by weight, preferably 0–70 parts by weight, of a thermoplastic copolymer formed from
C.1 50–95 parts by weight of styrene, α-methylstyrene, styrene substituted in the nucleus, methyl methacrylate or mixtures thereof and
C.2 50–5 parts by weight of acrylonitrile, methacrylonitrile, methyl methacrylate, maleic anhydride, N-substituted maleimide or mixtures thereof.

Thermoplastic, aromatic polycarbonates A which are suitable according to the invention are those based on diphenols of formula (I)

wherein
A is a single bond, $C_1$–$C_5$-alkylene, $C_2$–$C_5$-alkylidene, $C_5$–$C_6$-cycloalkylidene, $-S-$ or $-SO_2-$, hal is chlorine or bromine,
x is 0, 1 or 2 and
n is 1 or 0,
and, optionally, additionally those of formula (Ia)

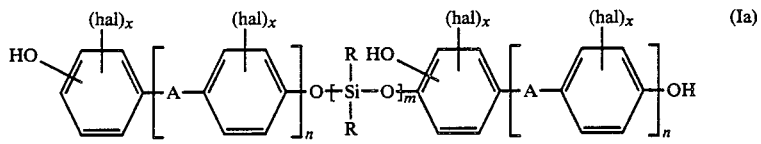

wherein

A, hal, x and n have the meaning mentioned for formula (I) and the radicals R are identical or different and are linear $C_1$-$C_{20}$-alkyl, branched $C_3$-$C_{20}$-alkyl or $C_6$-$C_{20}$-aryl, preferably $CH_3$, and m is an integer between 5 and 100, preferably between 20 and 80.

Suitable polycarbonates are homopolycarbonates of diphenols of formula I and copolycarbonates of diphenols of formula I and diphenols of formula (Ia) the proportion of which by weight in the copolycarbonates is 1 to 20% by weight, preferably 1.5 to 15% by weight and especially 2 to 10% by weight, relative to the total weight of the diphenols employed. Mixtures which are also suitable are those of a copolycarbonate based on the diphenols (Ia) and (I) and another siloxane-free, thermoplastic polycarbonate, the content of diphenol (Ia) in the polycarbonate mixture being between 1 and 20% by weight, relative to the total diphenols.

Methods for the preparation of the polycarbonates A are known such as reaction of the bisphenols and phosgene by the phase-boundary process or the homogeneous phase process ("pyridine process"); the molecular weight can be adjusted by means of an appropriate amount of a known chain terminator (for polycarbonates containing poly-diorganosiloxanes see German Offenlegungsschrift No. 3,334,872).

Examples of suitable chain terminators are phenol, p-chlorophenol, p-tert-butylphenol, 2,4,6-tribromophenol, and long-chain alkylphenols, such as 4-(1-3-tetramethylbutyl)-phenol according to German Offenlegungsschrift No. 2,842,005 as well as monoalkylphenols and dialkylphenols having a total of 8-20 C atoms in the alkyl substituents according to German Offenlegungsschrift No. 3,506,472, such as 3,6-di-tert-butylphenol, p-iso-octylphenol, p-tert.-octylphenol, p-dodecylphenol and 2-(3,5-dimethylheptyl)-phenol and 4-(3,5-dimethylheptyl)-phenol.

The Polycarbonates A have weight average molecular weights ($\overline{M}w$, measured, for example, by ultracentrifugation or light scattering measurement) of 10,000 to 200,000, preferably 20,000-80,000.

Examples of suitable diphenols of the formula (I) are hydroquinone, resorcinol, 4,4'-dihydroxydiphenol, 2,2-bis(4-hydroxyphenyl)-propane, 2,4-bis-(4-hydroxyphenyl)-2-methylbutane, 1,1-bis-(4-hydroxyphenyl)-cyclohexane, 2,2-bis(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

Preferred diphenols of the formula I are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Diphenols of the formula Ia which are particularly suitable are those in which R is $C_1$-$C_4$-alkyl, such as methyl, ethyl, propyl, n-butyl or tert-butyl or is phenyl.

Preferred diphenols of the formula (Ia) correspond to the formula (Ib)

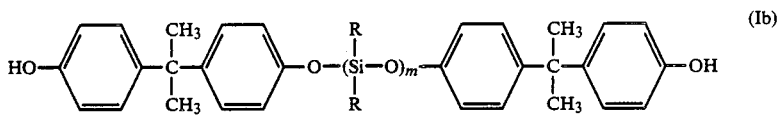

wherein the radicals R are identical and denote $C_1$-$C_4$-alkyl or phenyl and m is an integer from 5 to 100, preferably from 30 to 80.

The diphenols of the formula (Ia) can pared from the bis-chloro compounds (II)

and the diphenols (I), for example in accordance with U.S. Pat. No. 3,419,634, column 3, in combination with U.S. Pat. No. 3,189,662.

In the bis-chloro compounds (II) R and m have the same meaning as in the diphenols (Ia) or (Ib).

The polycarbonates A can be branched in a known manner, preferably by the incorporation of 0.05–2.0 mol %, relative to the sum of the diphenols employed, of compounds having a functionality of three or more, for example those having three or more than three phenolic groups.

In addition to bisphenol A homopolycarbonate, preferred polycarbonates are the copolycarbonates of bisphenol A with up to 15 mol %, relative to the molar totals of diphenols, of 2,2-bis-(3,5-dibromo-4-hydroxyphenyl)-propane or the copolycarbonates of the diphenols of the formula (I) with 1–20% by weight of diphenols of the formula (Ia), preferably of the formula (Ib), in each case relative to the total weight of the diphenols (I) and (Ia) or (I) and (Ib). The silicone rubber constituting the grafting base of the graft copolymer contains units of the general formulae $R_2SiO$, $RSiO_{3/2}$, $R_2R^3SiO_{1/2}$, $SiO_{4/2}$        a.

and $R^1CH\!=\!CH\!-\!(R^2)-$        b.

and $H\!-\!S\!-$        c.

R is a monovalent, hydrocarbon radical in particular saturated hydrocarbon or aromatic hydrocarbon such as $CH_3$, phenyl or $C_2H_5$, $R^1$ is H or $C_1$–$C_6$-alkyl, especially $CH_3$, $R^2$ is a single bond or $C_1$–$C_4$-alkylene, especially —$C_2H_4$—, —$CH_2$— or a single bond, and $R^3$ is R or —OH.

In this regard, the amounts of the individual siloxane units are arranged such that 0 to 0.5 molar unit of $R_2R^3SiO_{1/2}$, 0 to 10 molar units of formula $RSiO_{3/2}$ and 0 to 3 molar units of formula $SiO_{4/2}$ are present per 100 molar units of the formula $R_2SiO$.

In preferred silicone rubbers, at least 80% of the radicals R are $CH_3$ groups.

In the case of the group $R_2R^3SiO_{1/2}$—which is the end group of the silicone rubber—one of the organic radicals can represent a hydroxyl group. A particularly preferred end group is the dimethylhydroxysiloxy unit.

The silicone rubbers contain, in addition, the groups b and c in a total amount of 2 to 10 mol %, relative to all the radicals R. The molar ratio of b to c is 3:1 to 1:3, preferably 2:1 to 1:2.

If only radicals b or radicals c are present, incorporated in the silicone rubber, further processing (of graft polymers prepared from the rubbers to give thermoplastic mouldings) result in incompatibility, which manifests itself, for example, in an inadequate quality in the surfaces of the mouldings.

Groups b which are particularly suitable are vinyl and ally groups. The group c. is S—H—, and is preferably introduced via mercaptoalkyl-, especially mercaptopropyl.

The silicone rubbers are in the form of particles and have average particle diameters ($d_{50}$ value) of 0.09–1 $\mu$m, preferably 0.09–0.4 $\mu$m, and are at least partly crosslinked, that is to say they have gel contents greater than 50% by weight, preferably greater than 70% by weight and especially within the range of 73–98% by weight.

The graft polymers B are prepared by free-radical graft polymerization of the monomer mixtures defined in B.1.1 and B.1.2 in the presence of the rubbers B.2 which are to be grafted.

Halogenostyrenes and p-methylstyrene are examples of styrenes which are substituted in the nucleus.

The graft monomers B.1.1 and B.1.2 are in polymerized form at least partly grafted onto the silicone. In particularly preferred graft polymers, more than 50% by weight of the monomers are graft-polymerized.

The graft polymers according to the invention can be prepared as follows:

the silicone rubber is prepared in a first stage by emulsion polymerization of a silicone oligomer.

The artisan knows how to prepare an emulsion of a longchain, OH-terminated silicone oil by emulsion polymerization. (c.f. U.S. Pat. No. 2,891,910 and British Pat. No. 1,024,024.) The procedure disclosed in the British patent of employing an alkylbenzenesulphonic acid, is particularly preferred, since this agent functions as the emulsifier and as the polymerization catalyst. When the polymerization is complete, the acid is neutralised.

Accordingly, the concentration of emulsifier can be kept low and there are not many interfering extraneous molecules from the catalyst present in the finished product after the preparation of the emulsion. It is also possible, however, to employ n-alkylsulphonic acids instead of the alkylbenzenesulphonic acids mentioned. It is also possible additionally to employ other emulsifiers as co-emulsifiers, in addition to the catalytically active sulfonic acid.

Co-emulsifiers of this type can be nonionic and anionic. Suitable anionic co-emulsifiers are, especially, salts of the above-mentioned n-alkylsulphonic acids or alkylbenzenesulphonic acids. Nonionic co-emulsifiers are polyoxyethylene derivatives of fatty alcohols and fatty acids. Examples of emulsifiers of this type are POE (3)-lauryl alcohol, POE (20)-oleyl alcohol, POE (7)-nonylphenol or POE (10)-stearate (the notation POE (3)-laurylalcohol denotes that 3 units of ethylene oxide have been added onto one molecule of larylalcohol, the number 3 representing an average value, POE (20) and POE (7) are defined accordingly). In general, silicone oils which have been formed by emulsion polymerization in the presence of nonionic co-emulsifiers have a lower molecular weight than those for which no co-emulsifier has been used. Control of the molecular weight of the OH-terminated silicone oil formed in the emulsion polymerization is effected, for example, via the temperature in the establishment of equilibrium between the siloxane, water and the silanol which is first formed by ring-opening of the siloxane for details relating to the correlation between temperature and molecular weight, reference is made to D. R. Weyenberg et al., J. Polymer Sci., Part C, 27, pages 28–34 (1969)).

Groups b and c. can be introduced into the silicone polymer by carrying out a reaction in the presence of suitable siloxane oligomers. Examples of suitable starting oligomers are tetramethyltetravinylcyclotetrasiloxane or γ-mercaptopropylmethyldimethoxysilane or the hydrolysate thereof.

These functional oligomers are added in the desired amounts to the principal oligomer octamethylcyclotetrasiloxane.

The incorporation of alkyl radicals R having longer chains, such as, for example, ethyl-, propyl or the like, or the incorporation of phenyl groups can also be achieved analogously.

The silicone rubber must be at least partly cross-linked.

Adequate cross-linking can be achieved when the preferred vinyl- and mercaptopropyl groups employed react with one another in the course of the emulsion polymerization, so that it can be unnecessary to add an external cross-linking agent. It is possible, however, to add a silane which causes cross-linking in order to increase the degree of cross-linking of the silicone rubber.

Branching or cross-linking can be achieved by adding, for example, tetraethoxisilane or a silane of the general formula $RSiX_3$ wherein X represents a hydrolysable group, in particular the alkoxy radical. R has the meaning described above. R is preferably methyl and phenyl. As well as tetraethoxysilane, methyltrimethoxysilane or phenyltrimethoxysilane are particularly preferred.

The graft copolymers B can be prepared by subjecting the graft monomers B.1.1 and B.1.2 to free-radical graft polymerization in the presence of the silicone rubber, especially at 40° to 90° C. The graft polymerization can be carried out in suspension, dispersion or emulsion. Continuous or discontinuous emulsion graft polymerization is preferred. This graft polymerization is carried out using free-radical initiators (belonging to the group comprising peroxides, azo compounds, hydroperoxides, persulphates or per phosphates) and also, if appropriate, using anionic emulsifiers, for example carboxonium salts, sulphonic acid salts or organic sulphates. Graft polymers having high graft yields, that is to say a large proportion of the polymer of the monomers B1 is chemically linked to the silicone rubber B2, are formed in this reaction. This special silicone rubber B2 renders superfluous special measures (which enable high grafting to be obtained).

The graft polymers prepared in this way can be processed by known methods for example by coagulating the latices with electrolytes (salts, acids or mixtures thereof), followed by purification and drying.

Preferred copolymers C are those formed from at least one monomer selected from styrene, α-methylstyrene, styrene substituted in the nucleus, according to C.1, together with at least one monomer selected from acrylonitrile, methacrylonitrile methylmethacrylate, maleic anhydride, N-substituted maleimide, according to C.2.

Copolymers C are frequently formed as byproducts in the course of the graft polymerization for the preparation of the component B, particularly when large amounts of monomers are grafted onto small amounts of rubber.

The amount of copolymer C to be employed in accordance with the invention, 0 to 80 parts by weight, does not include these byproducts of the graft polymerization.

The copolymers C are resinous, thermoplastic and rubberfree. Particularly preferred copolymers C are those formed from styrene and/or α-methylstyrene together with acrylonitrile and, optionally, methylmethacrylate.

Weight ratios which are particularly preferred in the thermoplastic copolymer C are 60-80% by weight of C.1. and 40-20% by weight of C.2.

The copolymers C are known and can be prepared by free-radical polymerization, especially by emulsion, suspension, solution or mass polymerization. The copolymers C preferably have molecular weights $\overline{M}w$ (weight average, determined by light scattering or sedimentation) between 15,000 and 200,000.

The moulding materials according to the invention can contain further additives which are known for polycarbonates, graft polymers or thermoplastic copolymers, such as stabilizers, pigments, mould release agents, flame-retarding agents and antistatic agents, in the customary amounts.

The moulding materials according to the invention can be prepared by mixing the ingredients in a known manner and melt-compounding or melt-extruding them at temperatures of 200°-330° C. in customary devices, such as internal kneaders, extruders or twin-screw extruders.

The invention also relates, therefore, to a process for the preparation of thermoplastic moulding materials containing polycarbonate A, graft polymer B and copolymer C and also, if appropriate, stabilizers, pigments, mould release agents, flame-retarding agents and/or antistatic agents, which is characterized in that these ingredients are mixed and are then melt-compounded and/or melt-extruded at 200° to 330° C. in customary devices.

The ingredients can be mixed successively or simultaneously at about 20° C. (room temperature) up to about 100° C.

The moulding materials of the present invention can be used to prepare mouldings of every kind, for example by injection moulding. The following are examples of mouldings: casing components (for example for household appliances, such as juice squeezers, coffee machines or mixers), covering panels for the building industry or automotive components. They are also employed for electrical equipment, for example for terminal strips, because they have very good electrical properties.

Mouldings can also be prepared by deep drawing from previously prepared panels or sheets.

Particle size or diameter always denotes average particle diameter $d_{50}$, determined by ultracentrifuge measurements by the method of W. Scholten et. al., Kolloid-Z. and Z. Polymere 250 (1972), 782-796.

EXAMPLES

Ingredients A and C

A. Linear polycarbonate based on bisphenol A having a relative solution viscosity $\eta_{rel}$ of 1.26-1.28, measured in $CH_2Cl_2$ at 25° C. and in a concentration of 0.5 g/100 ml.

C. Styrene/acrylonitrile copolymer having a styrene/acrylonitrile ratio of 72:28 and an intrinsic viscosity of ($\eta$) 0.55 dl/g (measured in dimethylformamide at 20° C.).

Preparation of the graft polymer B

1. Preparation of silicone rubber emulsions 1.1. 38.4 parts by weight of octamethylcyclotetrasiloxane, 1.2% parts by weight of tetramethyltetravinylcyclotetrasiloxane and 1 part by weight of γ-mercaptopropylmethyldimethoxysiloxane are stirred together. 0.5 parts by weight of dodecylbenzenesulphonic acid is added, and then 58.4 parts by weight of water are added in the course of 1 hour. The mixture is vigorously stirred meanwhile. The preliminary emulsion is homogenized twice at 200 bar using a high-pressure emulsifying machine. A further 0.5 parts by weight of dodecylbenzenesulphonic acid is added.

The emulsion is stirred for 2 hours at 85° C. and then for 36 hours at 20° C. It is neutralized by means of 5 n-NaOH. This gives a stable emulsion having a solids content of approximately 36% by weight. The polymer has a gel content of 82% by weight, measured in toluene; the average particle size is approximately 300 nm.

1.2. A further emulsion containing 0.2 parts by weight of tetraethoxysilane in addition to the ingredients of Example 1.1 is prepared as described under 1.

1.3. A further emulsion containing the ingredients of Example 1 with the exception of γ-mercaptopropylmethyldiethoxysilane (does not result in blends according to the invention) is prepared as described under 1.

1.4. A further emulsion containing the ingredients of Example 1 with the exception of tetramethyltetravinylcyclotetrasilane (does not result in blends according to the invention) is prepared as described under 1.

2. Preparation of the graft polymers B

B.1. The following are initially placed in a reactor:
2107 parts by weight of latex 1.1 and
1073 parts by weight of water.

After the reaction has been initiated by means of a solution of 7.5 parts by weight of potassium peroxodisulfate in 195 parts by weight of water at 65° C., the following solutions are fed uniformly into the reactor in the course of 4 hours:
Solution 1:
540 parts by weight of styrene and
210 parts by weight of acrylonitrile Solution 2:
375 parts by weight of water and
15 parts by weight of the sodium salt of
C$_{14}$-C$_{18}$-alkylsulphonic acids.

Polymerization is then carried out to completion at 65° C. in the course of 6 hours. This gives a latex having a solids content of approximately 33% by weight.

After being coagulated with an aqueous solution of magnesium chloride/acetic acid, filtered off and dried in vacuo, the graft polymer is obtained in the form of a white powder.

B.2–B.4. Graft polymers are prepared from emulsions 1.2, 1.3 and 1.4 analogously to the metod described for B.1.

B.5. Graft polymer formed from 50% by weight of coarsely articulate, cross-linked polybutadiene and 50% by weight of a styrene/acrylonitrile mixture in a styrene/acrylonitrile ratio of 72:28, prepared by emulsion polymerization; average particle size (d$_{50}$) 400 nm.

B.6. An ASA graft polymer formed from 60% by weight of coarsely articulate, highly cross-linked acrylate rubber and 40% by weight of a styrene/acrylonitrile mixture in a weight ratio of 72:28, having an average particle size (d$_{50}$) of approximately 400 nm. The product was prepared as specified in EP No. 34,748.

Preparation of the moulding materials according to the invention

The components A, B and C are compounded in a 3 liter internal kneader at temperatures of 200°–220° C.

Unless otherwise indicated, the mouldings are prepared on an injection moulding machine at 260° C.

The notched impact strength was measured by the Izod method on bars of dimensions 2.5×½×1.8" as specified in ASTM D-256, at room temperature, −20° C., −40° C., −50° C. and −60° C.

The surface of the mouldings was assessed visually on bars of dimensions 2.5×½×⅛" and on small sheets of dimensions 60×90×2 mm.

As the following table shows, mixtures having a good surface quality and low-temperature impact strength values better than the state of the art are only obtained with the graft polymers according to the invention.

(ii) 50 to 5 parts by weight of acrylonitrile, methacrylonitrile, maleic anhydride, N-substituted maleimide or a mixture thereof, grafted onto (2) 95 to 10 parts by weight of a silicone rubber having an average particle diameter (d$_{50}$ value) of 0.09 to 1.0 μm, and a gel content greater than 50% by weight containing, essentially, units of the general formulae $$R_2SiO, RSiO_{3/2}, R_2R^3SiO_{1/2} \quad \text{a.}$$

and $$R^1CH=CH-(R^2)- \quad \text{b.}$$

and $$H-S- \quad \text{c.}$$

in which

R denotes a monovalent hydrocarbon radical

R$^1$ denotes hydrogen or a C$_1$–C$_6$-alkyl radical, R$^2$ denotes a single bond or a C$_1$–C$_4$-alkylene radical, and R$^3$ has any of those meanings given for R or denoes a hydroxyl group, wherein 0 to 0.5 molar unit of R$_2$R$^3$SiO$_{1/2}$, 0 to 10 molar units of the formula RSiO$_{3/2}$ and 0 to 3 molar units of the formula SiO$_{4→2}$ are present per 100 molar units of formula R$_2$SiO, the amount of the groups b and c is 2 to 10 mol %, relative to the sum of a+b+c, and the molar ratio of the groups b:c is between 3:1 and 1:3, C. 0 to 80 parts by weight of a thermoplastic copolymer formed from (1) 50 to 95 parts by weight of styrene, α-methylstyrene, styrene substituted in the nucleus, methyl methacrylate or a mixture thereof and (2) 50 to 5 parts by weight of acrylonitrile, methacrylonitrile, maleic anhydride, N-substituted maleimide or a mixture thereof.

2. A thermoplastic moulding material according to claim 1 containing 20 to 95 parts by weight of the polycarbonate(s) of component A, 5 to 60 parts by weight of

TABLE

| A | B.1 | B.2 | B.3 | B.4 | B.5 | B.6 | C | Surface* | Room Temp. | −20° C. | −40° C. | −50° C. | −60° C. |
|---|---|---|---|---|---|---|---|---|---|---|---|---|---|
| Parts by Weight | | | | | | | | | | Knotched Izod impact strength J/m | | | |
| according to the invention | | | | | | | | | | | | | |
| 45 | 33 | | | | | | 22 | + | 610 | 428 | 371 | 330 | 297 |
| 60 | 24 | | | | | | 16 | + | 748 | 627 | 540 | 511 | 474 |
| 60 | | 24 | | | | | 16 | + | 677 | 517 | 462 | — | — |
| comparison examples | | | | | | | | | | | | | |
| 60 | | | 24 | | | | 16 | — | 587 | 464 | 415 | — | — |
| 60 | | | | 24 | | | 16 | — | 193 | 107 | — | — | — |
| 45 | | | | | 33 | | 22 | + | 594 | 525 | 295 | — | — |
| 60 | | | | | 24 | | 16 | + | 565 | 479 | 403 | — | — |
| 60 | | | | | 20 | 20 | 20 | + | 764 | 250 | — | — | — |

* + fault-free;-surface waviness or defects

We claim:
1. A thermoplastic moulding material containing
   A. 5 to 98 parts by weight of one or more thermoplastic polycarbonates,
   B. 2 to 70 parts by weight of one or more graft polymers formed from
      (1) 5 to 90 parts by weight of a mixture of
         (i) 50 to 95 parts by weight of styrene, α-methylstyrene, styrene substituted in the nucleus, methyl methacrylate or a mixture thereof and the graft polymer(s) of component B, and 0 to 70 parts by weight of the copolymer of component C.

3. A thermoplastic moulding material according to claim 1, in which the graft polymer(s) of component B are formed from 30 to 80 parts by weight of the mixture of component (1) and 70 to 20 parts by weight of the rubber of component (2).

4. A thermoplastic moulding material according to claim 1, in which the molar ratio of b:c in the rubber (2) of component B is 2:1 to 1:2.

5. A thermoplastic moulding material according to claim 1, in which the average particle diameter of the rubber (2) of component B is between 0.09 and 0.4 μm.

6. A thermoplastic moulding material according to claim 1, in which the gel content of the rubber (2) of component B is 73 to 98% by weight.

7. A thermoplastic moulding material according to claim 1, in which R denotes a methyl, ethyl or phenyl group, $R^1$ denotes hydrogen or a methyl group, $R^2$ denotes —$CH_2$—, $C_2H_4$— or a single bond and $R^3$ has any of those meanings given for R or denotes a hydroxyl group.

8. A thermoplastic moulding material according to claim 1, in which the polycarbonate of component A is a Copolycarbonate containing 1 to 20% by weight of diphenol(s) of the formula

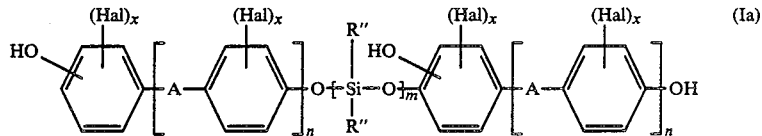

in which x is 0, 1 or 2, n is 0 or 1, m is an integer from 5 to 100, Hal denotes a halogen atom, A denotes a single bond, $C_1$–$C_5$-alkylene, $C_2$–$C_5$-alkylidene, $C_5$–$C_6$-cycloalkylidene, —S—, or —$SO_{12}$— and the radicals R" are identical or different, linear $C_6$–$C_{20}$ aryl radicals or branched $C_3$–$C_{20}$ alkyl radicals, relative to the total weight of the diphenols employed.

* * * * *